(12) United States Patent
Sung et al.

(10) Patent No.: US 7,643,287 B2
(45) Date of Patent: Jan. 5, 2010

(54) DETACHABLE ASSEMBLY

(75) Inventors: Tzu-Wen Sung, Taipei (TW);
Wei-Chuan Hsu, Taipei (TW)

(73) Assignee: Inventec Corporation, Taipei (TW)

( * ) Notice: Subject to any disclaimer, the term of this patent is extended or adjusted under 35 U.S.C. 154(b) by 226 days.

(21) Appl. No.: 11/845,253

(22) Filed: Aug. 27, 2007

(65) Prior Publication Data

US 2009/0057523 A1 Mar. 5, 2009

(51) Int. Cl.
*H05K 5/00* (2006.01)
*H05K 7/00* (2006.01)
*A47B 81/00* (2006.01)
*A47B 97/00* (2006.01)

(52) U.S. Cl. ............. 361/679.58; 361/679.6; 312/223.2

(58) Field of Classification Search ............ 361/679.58, 361/679.6; 312/223.2
See application file for complete search history.

(56) References Cited

U.S. PATENT DOCUMENTS

| | | | | |
|---|---|---|---|---|
| 5,031,070 A | * | 7/1991 | Hsu | ............... 361/679.6 |
| 5,691,503 A | * | 11/1997 | Kato | ............... 174/375 |
| 5,975,659 A | * | 11/1999 | Yang et al. | ............... 312/223.2 |
| 6,356,436 B1 | * | 3/2002 | Buican et al. | ............... 361/679.58 |
| 6,555,747 B2 | * | 4/2003 | Chen et al. | ............... 174/559 |

* cited by examiner

*Primary Examiner*—Jayprakash N Gandhi
*Assistant Examiner*—Anthony M Haughton
(74) *Attorney, Agent, or Firm*—J.C. Patents

(57) ABSTRACT

A detachable assembly including a body and a panel is provided. The body is suitable for being disposed on a carrying surface, and the body includes a bottom plate and at least one first supporting element. The bottom plate has at least one opening having a first side and a second side. The first supporting element is connected to the first side of the opening. The first supporting element is at an angle with the bottom plate. The panel is detachably disposed at the body. The panel has a bottom portion and at least one second supporting element disposed on the bottom portion. When the panel is partially detached from the body, the second supporting element passes through the opening and leans against the first supporting element and the second side of the opening so that the panel will not drop and cause some damage.

5 Claims, 7 Drawing Sheets

DETACHABLE ASSEMBLY

BACKGROUND OF THE INVENTION

1. Field of the Invention

The present invention generally relates to an assembly, and more particularly, to a detachable assembly.

2. Description of Related Art

As far as computer casings are concerned, one way of assembling a casing is different from another way of assembling another casing because many new designed casings are produced. When a user needs to add a new electronic component (for example, an interface card) or do some repair, a portion of the casing must normally be detached.

FIG. 1 is a schematic side view of a conventional casing. As shown in FIG. 1, a conventional casing 100 includes a body 110 and a front panel 120. The front panel 120 is detachably disposed at the body 110 and can be locked to the body 110 through a number of screws (not shown).

However, the detached front panel 120 may easily drop and produce some damage when the user tris to detach the front panel 120 from the body 110.

SUMMARY OF THE INVENTION

Accordingly, the present invention provides a detachable assembly having a detachable panel that may lean against a body.

According to an embodiment of the present invention, a detachable assembly including a body and a panel is provided. The body is suitable for being disposed on a carrying surface, and the body includes a bottom plate and at least one first supporting element. The bottom plate has at least one opening and the opening has a first side and a second side. The first supporting element is connected to the first side of the opening. The first supporting element is at an angle with the bottom plate. The panel is detachably disposed at the body. The panel has a bottom portion and at least one second supporting element disposed on the bottom portion. When the panel is partially detached from the body, the second supporting element passes through the opening and leans against the first supporting element and the second side of the opening.

In an embodiment of the present invention, the opening may be a rectangular opening, and the first side is opposite to the second side.

In an embodiment of the present invention, the first supporting element may have a supporting portion and at least a notch. The notch extends from a third side of the supporting portion toward the first side of the opening. The second supporting element may have at least one first protrusion and one second protrusion. When the panel is partially detached from the body, the first protrusion passes through the opening and the notch and leans against a fourth side of the notch, and the second protrusion passes through the opening and leans against the third side of the supporting portion and the second side of the opening. In addition, the second protrusion is substantially perpendicular to the first protrusion. Moreover, the first supporting element may have two notches, and the second supporting element may have two first protrusions. When the panel is partially detached from the body, each of the first protrusions passes through the opening and one of the notches and leans against the fourth side of one of the notches.

In an embodiment of the present invention, the panel may further have a top portion and a fastener disposed on the top portion. When the panel is disposed on the body, the fastener locks the body.

Accordingly, because the second supporting element of the panel passes through the opening of the bottom plate and leans against the first supporting element of the bottom plate and the second side of the opening when the panel is partially detached from the body, the panel will not drop and produce possible damage. In addition, because the fastener on the panel locks the body when the panel is disposed on the body, the panel may be detached from the body or assembled to the body easily.

In order to make the aforementioned and other objects, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
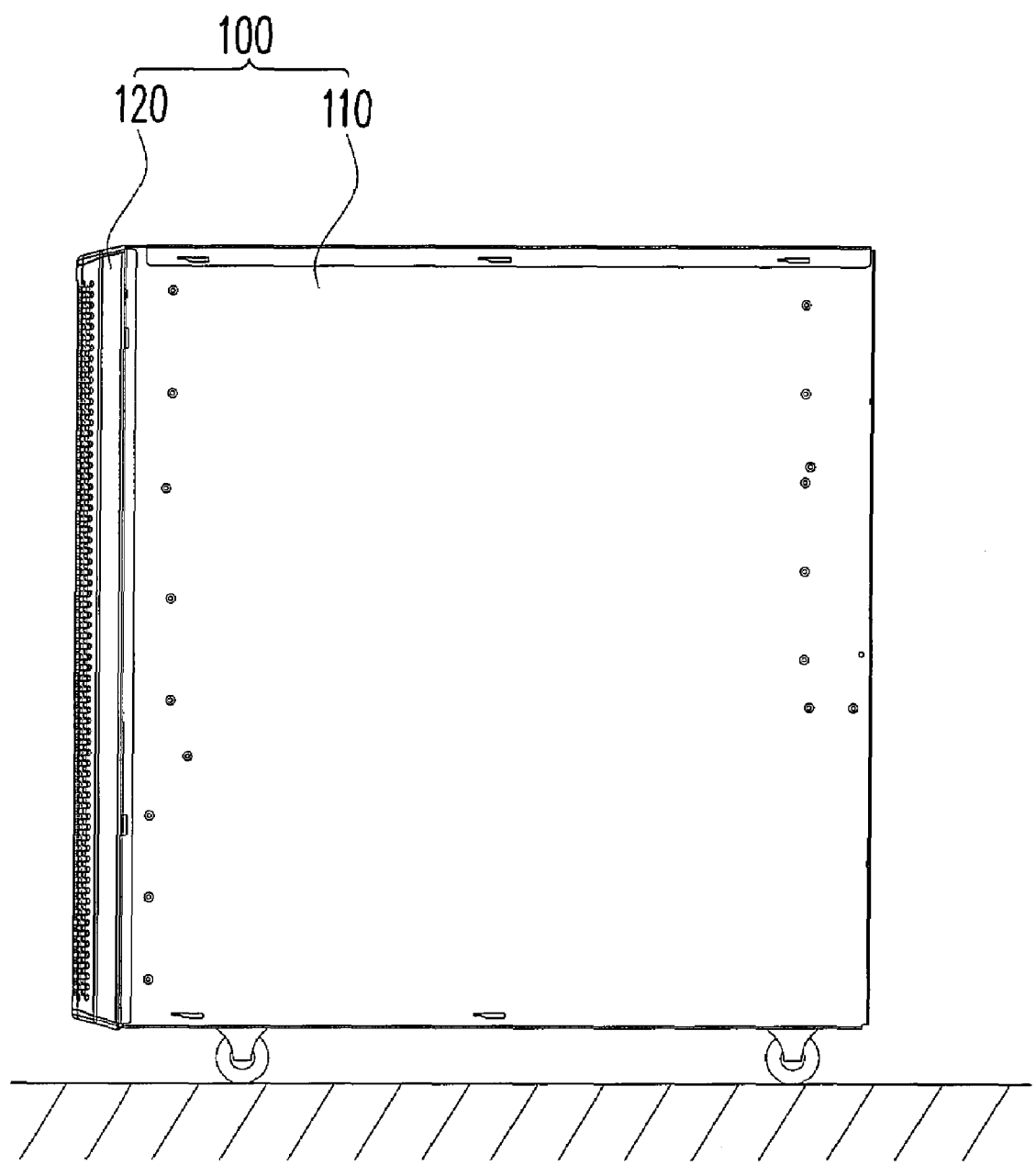
FIG. 1 is a schematic side view of a conventional casing.

Reference will now be made in detail to the present preferred embodiments of the invention, examples of which are illustrated in the accompanying drawings. Wherever possible, the same reference numbers are used in the drawings and the description to refer to the same or like parts.

Figure 2:
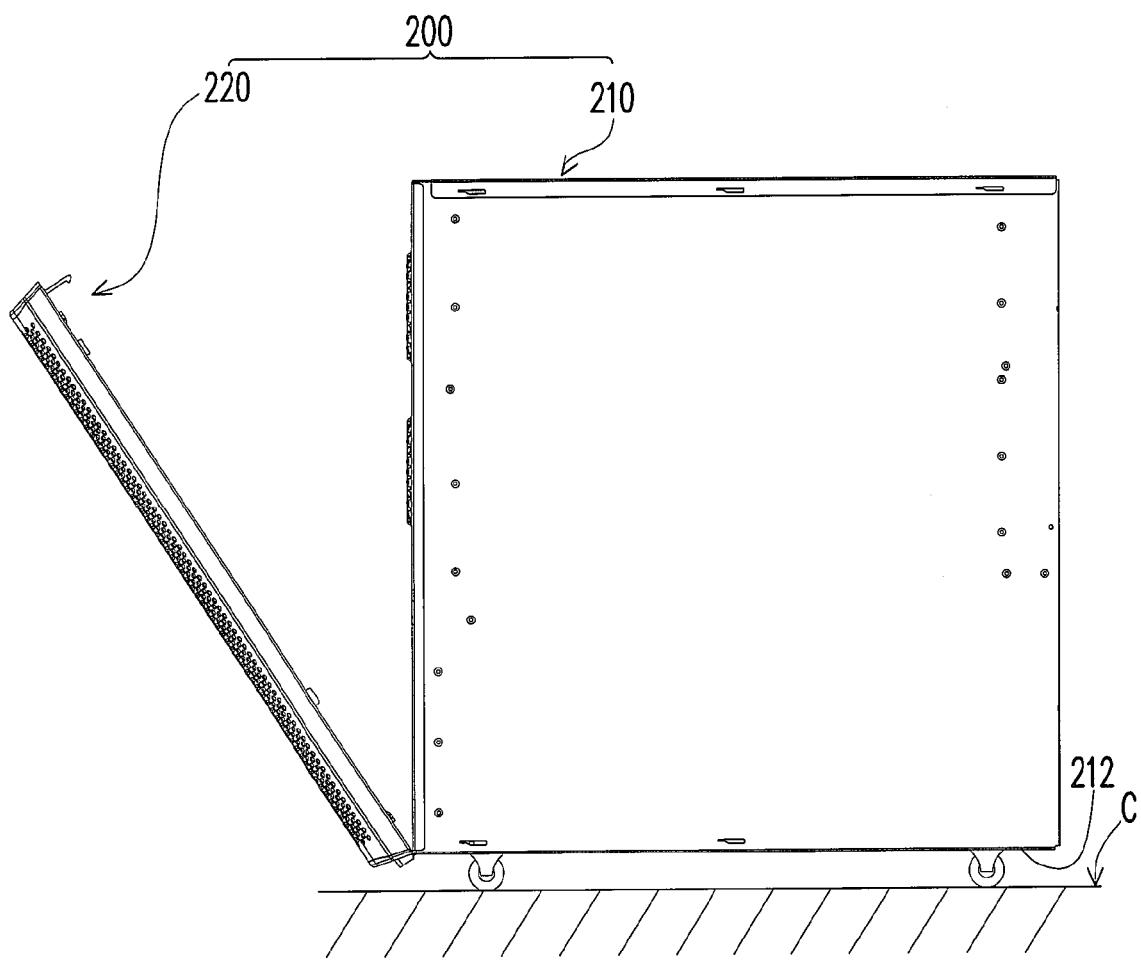
FIG. 2 is a schematic side view of a detachable assembly according to an embodiment of the present invention.
Figure 3:
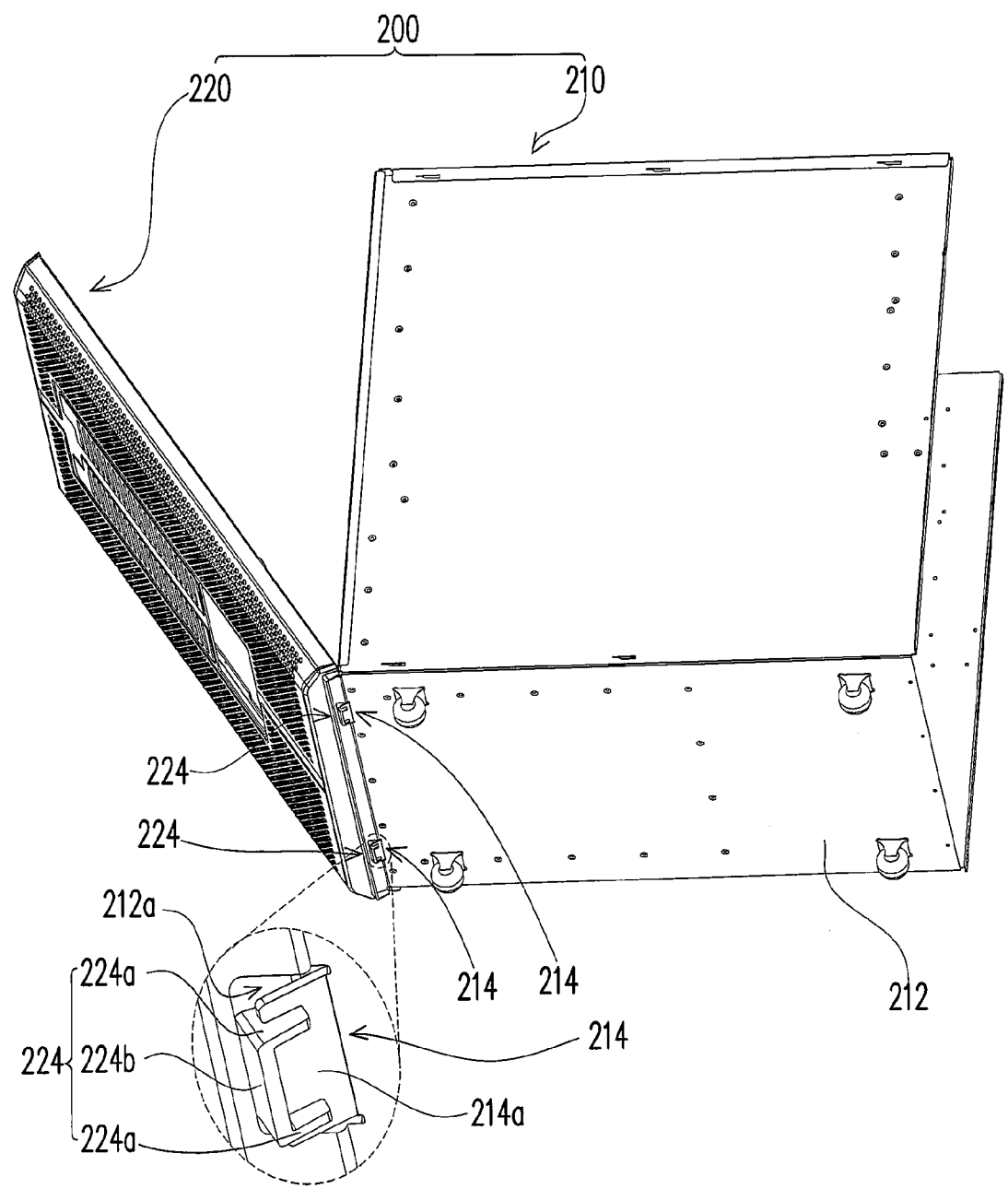
FIG. 3 is a schematic perspective view of the detachable assembly in FIG. 2.

FIG. 2 is a schematic side view of a detachable assembly according to an embodiment of the present invention. FIG. 3 is a schematic perspective view of the detachable assembly in FIG. 2. As shown in FIGS. 2 and 3, the detachable assembly 200 of the present embodiment may be a casing, for example, a computer casing. The detachable assembly 200 includes a body 210 and a panel 220. The body 210 is suitable for being disposed on a carrying surface C. The body 210 includes a bottom plate 212 and at least one first supporting element 214 (two are shown in FIG. 3).

Figure 4:
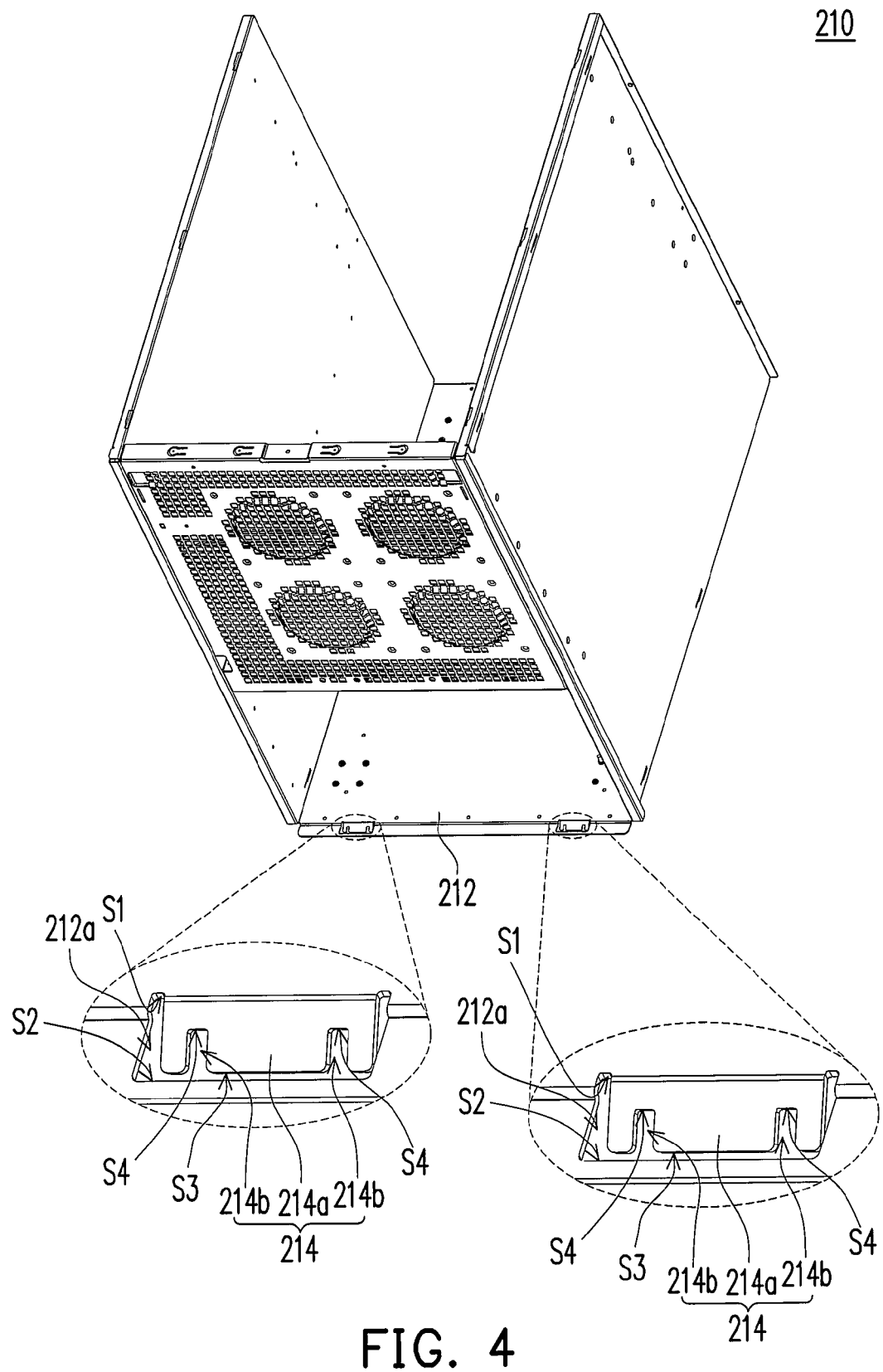
FIG. 4 is a schematic perspective view of the body in FIG. 3.

FIG. 4 is a schematic perspective view of the body in FIG. 3. As shown in FIG. 4, the bottom plate 212 has at least one opening 212a (two are shown in FIG. 4), and each opening 212a has two sides S1 and S2. In the present embodiment, each opening 212a may be a rectangular opening and the side S1 of each opening 212a is opposite to the corresponding side S2. In addition, each first supporting element 214 is connected to the side S1 of the corresponding opening 212a. More specifically, according to the relative locations shown in FIG. 4, the left first supporting element 214 is connected to the side S1 of the left opening 212a, and the right first supporting element 214 is connected to the side S1 of the right opening 212a. Furthermore, each first supporting element 214 is at an angle with the bottom plate 212. In other words, each first supporting element 214 is inclined with the bottom plate 212.

In the present embodiment, each first supporting element 214 may have a supporting portion 214a and at least one notch 214b (two are shown in FIG. 4). The notches 214b of each first supporting element 214 extend from a side S3 of the corresponding supporting portion 214a toward the side S1 of the corresponding opening 212a. More specifically, according to the relative locations shown in FIG. 4, the notches 214b of the left first supporting element 214 extend from the side S3 of the supporting portion 214a of the left first supporting element 214 toward the side S1 of the left opening 212a. Similarly, the notches 214b of the right first supporting element 214 extend from the side S3 of the supporting portion 214a of the right first supporting element 214 toward the side S1 of the right opening 212a.

Figure 5:
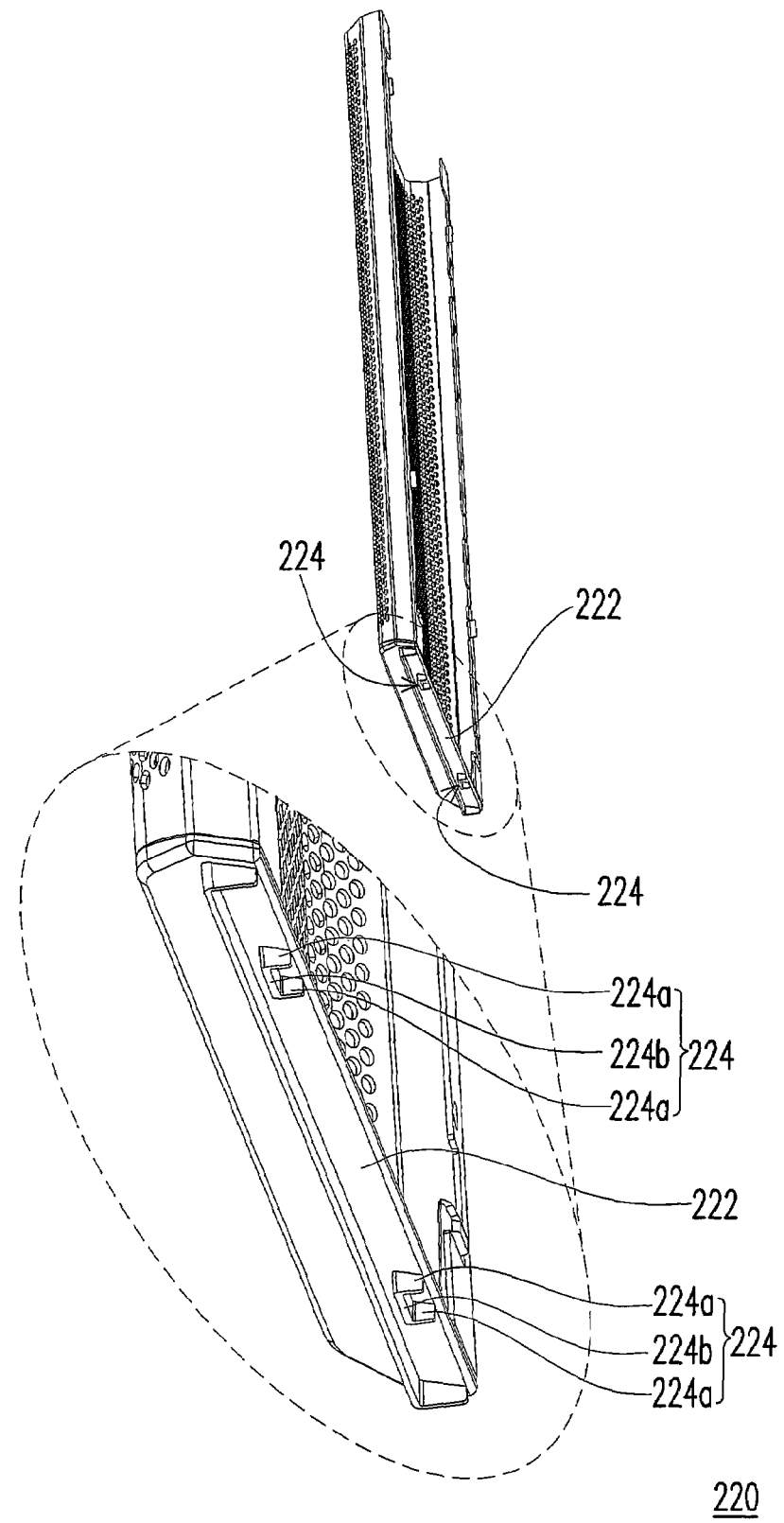
FIG. 5 is a schematic perspective view of the panel in FIG. 3.

FIG. 5 is a schematic perspective view of the panel in FIG. 3. As shown in FIG. 5, the panel 220 has a bottom portion 222 and at least one second supporting element 224 (two are shown in FIG. 5) disposed on the bottom portion 222. In the present embodiment, each second supporting element 224 may have at least one first protrusion 224a (two are shown in FIG. 5) and one second protrusion 224b. In addition, the first protrusions 224a of each second supporting element 224 are substantially perpendicular to the corresponding second protrusion 224b. More specifically, according to the relative locations in FIG. 5, the first protrusions 224a of the left upper second supporting element 224 are substantially perpendicular to the second protrusion 224b of the left upper second supporting element 224. Similarly, the first protrusions 224a of the right lower second supporting element 224 are substantially perpendicular to the second protrusion 224b of the right lower second supporting element 224.

As shown in FIGS. 3, 4 and 5, when the pane 220 is partially detached from the body 210, each of the second supporting elements 224 passes through the corresponding opening 212a and leans against the corresponding first supporting element 224 and the side S2 of the corresponding opening 212a. More specifically, in the present embodiment, when the panel 220 is partially detached from the body 210, each of the first protrusions 224a of each second supporting element 224 passes through the corresponding opening 212a and the corresponding notch 214b and leans against a side S4 of the corresponding notch 214b, and the second protrusion 224b of each second supporting element 224 passes through the corresponding opening 212a and leans against the side S3 of the corresponding supporting portion 214a and the side S2 of the corresponding opening 212a.

Because each of the second supporting elements 224 passes through the corresponding opening 212a and leans against the corresponding first supporting element 214 and the side S2 of the corresponding opening 212a when the pane 220 is partially detached from the body 210, the panel 220 will not drop and produce possible damage.

Figure 6:
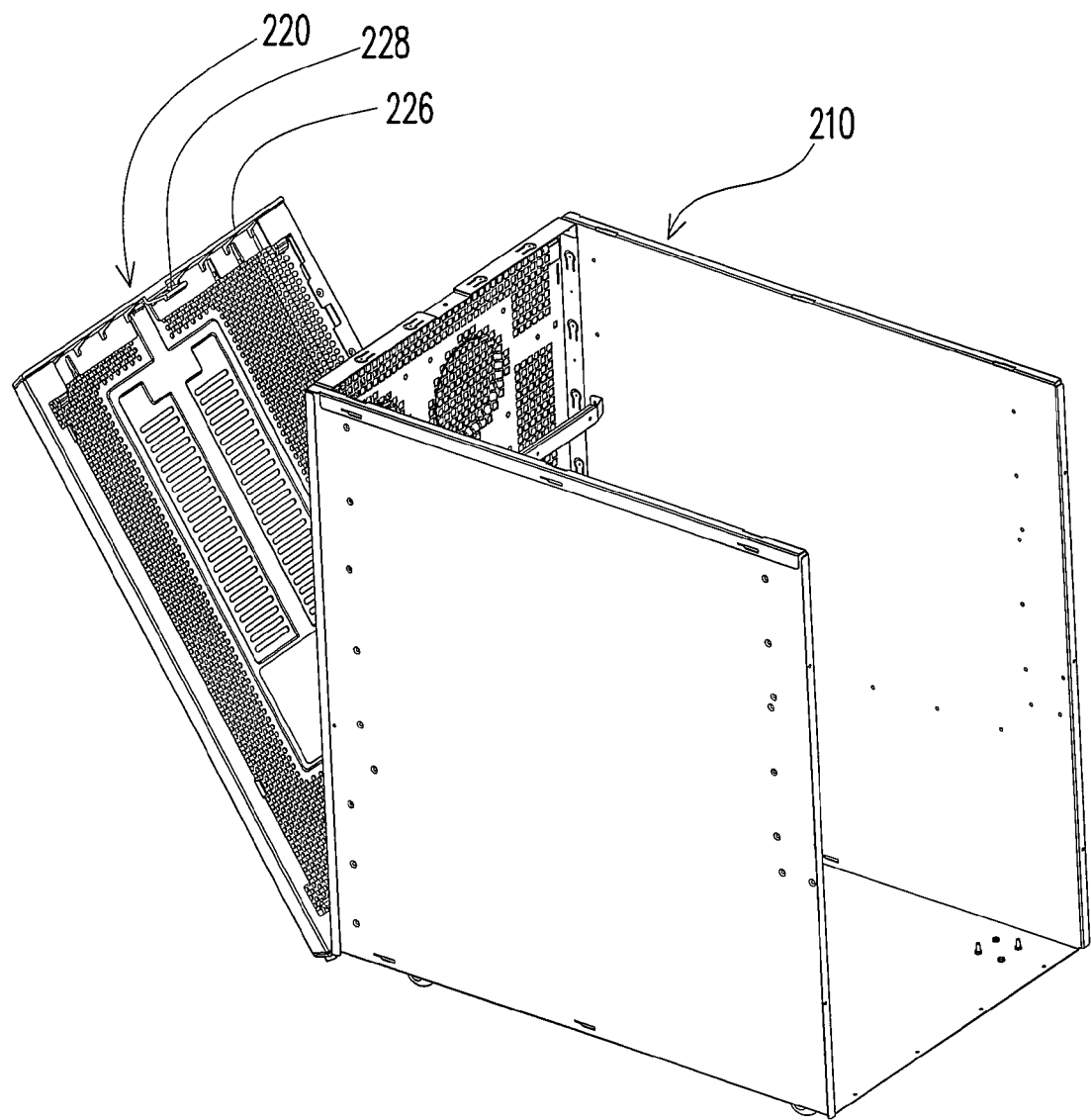
FIG. 6 is another schematic perspective view of the detachable assembly in FIG. 2.
Figure 7:
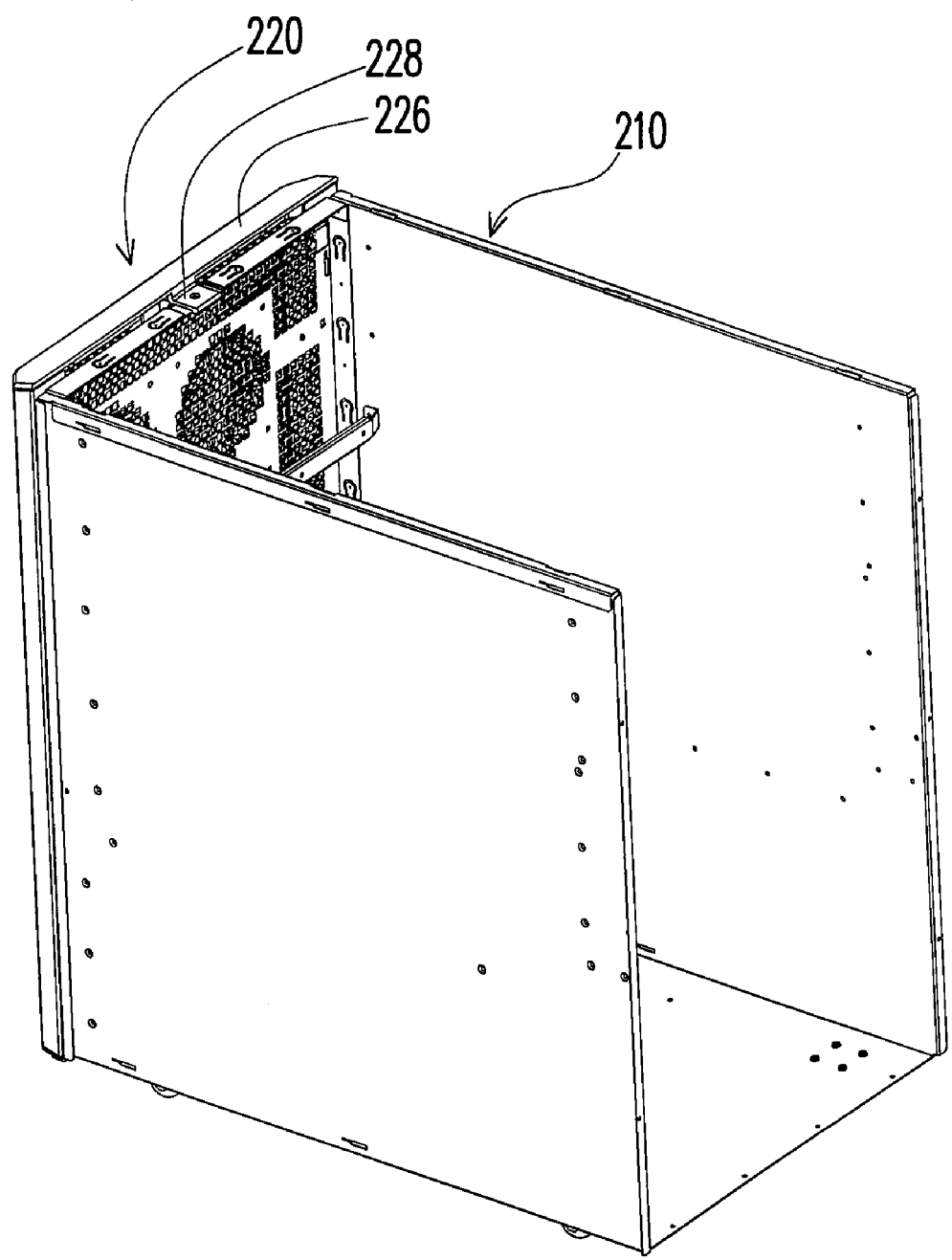
FIG. 7 is a schematic perspective view of the panel in FIG. 6 disposed on the body.

FIG. 6 is another schematic perspective view of the detachable assembly in FIG. 2. FIG. 7 is a schematic perspective view of the panel in FIG. 6 disposed on the body. As shown in FIGS. 6 and 7, in the present embodiment, the panel 220 may further have a top portion 226 and a fastener 228 disposed on the top portion 226. When the panel 220 is disposed on the body 210, the fastener 228 locks the body 210.

Because the fastener 228 locks the body 210 when panel 220 is disposed on the body 210, the panel 220 is easier to be detached from the body 210 or assembled to the body 210.

In summary, the detachable assembly of the present invention has at least the following advantages:

1. Because each of the second supporting elements of the panel passes through the corresponding opening of the base plate and leans against the corresponding first supporting element of the base plate and the side of the corresponding opening when the panel is partially detached from the body, the panel will not drop and produce possible damage.

2. Because the fastener on the panel locks the body when the panel is disposed on the body, the panel is easier to be detached from the body or assembled to the body.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A detachable assembly, comprising:
a body, suitable for being disposed on a carrying surface, comprising:
    a bottom plate, having at least one opening, wherein the opening has a first side and a second side; and
    at least one first supporting element, connected to the first side of the opening, wherein the first supporting element is at an angle with the bottom plate; and
a panel, detachably disposed on the body, wherein the panel has a bottom portion and at least one second supporting element disposed on the bottom portion, when the panel is partially detached from the body, the second supporting element passes through the opening and leans against the first supporting element and the second side of the opening, the first supporting element has a supporting portion and at least one notch, the notch extends from a third side of the supporting portion toward the first side of the opening, the second supporting element has at least one first protrusion and one second protrusion, and when the panel is partially detached from the body, the first protrusion passes through the opening and the notch and leans against a fourth side of the notch, and the second protrusion passes through the opening and leans against the third side of the supporting portion and the second side of the opening.

2. The detachable assembly according to claim 1, wherein the opening is a rectangular opening and the first side is opposite to the second side.

3. The detachable assembly according to claim 1, wherein the second protrusion is substantially perpendicular to the first protrusion.

4. The detachable assembly according to claim 1, wherein the first supporting element has two notches and the second supporting element has two first protrusions, and when the panel is partially detached from the body, each of the first protrusions passes through the opening and one of the notches and leans against the fourth side of one of the notches.

5. The detachable assembly according to claim 1, wherein the panel further comprises a top portion and a fastener disposed on the top portion, and the fastener locks the body when the panel is disposed on the body.

* * * * *